United States Patent Office 3,206,404
Patented Sept. 14, 1965

3,206,404
LUBRICANTS CONTAINING BENZALALKYL-
IMINE COPOLYMERS
Ellis K. Fields, Chicago, Ill., assignor to Standard Oil
Company, Chicago, Ill., a corporation of Indiana
No Drawing. Original application Aug. 18, 1958, Ser. No.
755,391, now Patent No. 3,072,617, dated Jan. 8, 1963.
Divided and this application Feb. 26, 1962, Ser. No.
175,800
7 Claims. (Cl. 252—50)

This application is a division of U.S. Ser. No. 755,391, filed August 18, 1958 (now U.S. Patent 3,072,617) entitled "Copolymer Composition."

This invention relates to novel compositions of matter which are effective as viscosity index improvers and detergents in lubricant compositions. More particularly, the invention pertains to improved lubricant compositions containing novel copolymers of a benzalalkylimine.

Within recent years it has become common practice to impart improved properties to lubricants through the use of various types of additives or addition agents. Lubricating oils employed in internal combustion engines such as automotive and diesel engines require the use of one or more addition agents to improve their serviceability under certain adverse operating conditions. Among the more important additives employed is the type which functions to prevent the formation and accumulation of sludge and varnish-like coatings on pistons and cylinder walls of the engine. Such additives which have the property of maintaining clean engines are referred to as "detergent-type" addition agents. Other addition agents in common usage are known as "viscosity index improvers." These additives function to improve the viscosity-temperature characteristics of the lubricant in which they are employed, said relationship commonly being expressed in the art as the viscosity index of the oil.

It is an object of this invention to provide novel copolymers of a benzalalkylimine such as benzalmethylimine. Another object of this invention is to provide novel addition agents which when added to a lubricant will improve both the detergent properties and the viscosity index thereof. Still another object is to provide lubricant compositions possessing improved detergency and viscosity-temperature characteristics. Other objects and advantages of the invention will become apparent in the following description thereof.

The above objects, among others, are achieved in accordance with this invention by incorporating in a lubricating oil a novel copolymer of benzalmethylimine with an ethylenically unsaturated monomer, said monomer being capable of addition homopolymerization through said unsaturation. My invention also provides new and useful copolymers of benzalalkylimine such as benzalmethylimines with such homopolymerizable monomers in admixture with other monomers containing internal ethylenic unsaturation which do not readily homopolymerize. Benzalmethylimine ($C_6H_5CH=N-CH_3$) can readily be prepared by the reaction of benzaldehyde with methylamine, as is well known in the art. I have discovered that although a benzalalkylimine such as benzalmethylimine does not homopolymerize, it will copolymerize with other polymerizable monomers to form copolymeric products which are useful as detergent additives and viscosity index improvers in lubricating oils.

In general, the monomers which will copolymerize with benzalmethylimine in accordance with this invention are characterized by having ethylenic unsaturation, that is, they contain non-aromatic

group. The monomers which are particularly suitable for polymerization are those which are relatively reactive, i.e., those which are capable of forming homopolymers in accordance with the teachings of the prior art. The preferred monomers are those containing a terminal ethylenic group, i.e. a $CH_2=CH-$ group, wherein at least one of the valence bonds is linked to a negative group, and the other bond is linked to hydrogen or hydrocarbon groups. The preferred monomers may therefore be defined as vinylidene compounds (which term is intended to include vinyl compounds) wherein there is attached to the vinylidene group at least one negative group or radical such as an aryl group (for example, as in styrene, alpha-methyl styrene, chlorinated styrenes, 3-methyl styrene, 3,4,5-trimethyl styrene, etc.); an acyloxy group (vinyl acetate, vinyl butyrate, vinyl decanoate, vinyl octadecanoate, etc.); an alkoxy group (vinyl ethyl ether, vinyl butyl ether, vinyl decyl ether, vinyl octadecyl ether, etc.); an aroyloxy group (vinyl benzoate, vinyl toluate, etc.); a carbalkoxy group (butyl acrylate, butyl methacrylate, octyl acrylate, cetyl methacrylate, laurylmethacrylate, octadecyl acrylate, octadecyl methacrylate, etc.); a halogen radical (vinyl chloride, vinyl bromide, vinyl iodide, vinyl fluoride, vinylidene chloride, etc.); a cyano group (acrylonitrile; methacrylonitrile, etc.); a lactum group (N-vinyl pyrrolidone, N-vinyl piperidone, etc.).

The reactive monomers, i.e., those capable of forming homopolymers, can be used in admixture with other monomers containing internal ethylenic unsaturation which do not readily homopolymerize but which will copolymerize with a benzalalkylimine such as benzalmethylimine and reaction monomer mixture. The preferred compound of this type are esters of butenedioic acids having the general formula

wherein $R_1$ and $R_2$ represent the same or different alkyl radicals having from about 4 to about 22 carbon atoms, and preferably from about 6 to about 12 carbon atoms, and $R_3$ is selected from the group consisting of hydrogen and a methyl radical. Examples of such internally unsaturated compounds are dibutyl fumarate, di-iso-octyl fumarate, dilauryl fumarate, dioctadecyl fumarate and the corresponding esters of maleic, citraconic and mesaconic acids.

The benzalalkylimines which may be used for copolymerization with the admixture of reactive monomers and monomers containing internal ethylenic unsaturation defined above, are the benzalalkylimines wherein the alkyl group has from 1 to 5 carbon atoms including methyl, ethyl, propyl, butyl and amyl groups and their isomers. The preferred benzalalkylimine is benzalmethylimine.

For use as lubricating oil additives the copolymers of this invention must, of course, be oil soluble. In order to achieve this end it is preferred that the polymerizable monomers used in conjunction with the benzalalkylimine each have from about 6 to about 30 carbon atoms, and preferably about 10 to about 24 carbon atoms in the molecule. In any given case oil solubility can readily be increased by adjusting the ratio of the reactants so as to increase the proportion of the more soluble monomer in the copolymer, for example, the proportion of diisooctyl fumarate in a mixture of the same, styrene, and benzalmethylimine, or by increasing the chain length of the substituent hydrocarbon groups, for example, the ester group when an acrylate or methacrylate is used or the side chain when an alkyl styrene is used. Suitable mole ratios of benzalmethylimine to other monomers in the copolymer range from about 1:200 to about 1:1 and preferably from about 1:50 to about 1:6. Because the benzalmethylimine monomer is not as active in polymerization as are the reactive monomers, it is advantageous to use from 1 to 12 wt. percent, and preferably 3 to 6 wt. percent, of the benzalmethylimine monomer in the total monomer mixture to obtain copolymers having a benzalmethylimine to other monomer ratio within the preferred range. It follows that the amount of vinylidene compound and internally unsaturated compound will be from 88 to 99 wt. percent of the total monomer mixture and preferably from 94 to 97 wt. percent. When a mixture of vinylidene compounds and internally unsaturated compounds (e.g., butenedioic acid esters such as maleates or fumarates) is used, the mole ratio of the vinylidene compounds to the internally unsaturated monomers should be at least as great as 1:1 in order to insure the formation of a copolymer.

The copolymerization can be carried out by any of the methods known to the art, i.e. in bulk, in solution or in emulsion. Bulk and solution polymerization are preferred, however. A particularly useful expedient is solution polymerization in which the solvent is a lubricating oil similar to that in which the additive is to be used; e.g., an SAE 10 to SAE 30 base oil when the additive is to be used in an automotive crankcase oil. This procedure results in a concentrate of the additive in oil solution which requires no purification and which is easily handled and dispensed.

In preparing the copolymeric products of this invention there can be employed as a catalyst any compound which is capable of initiating polymerization by providing stable free radicals under the conditions of the reaction. Examples of such catalysts are peroxy compounds, for example, organic peroxides, peroxy salts, hydroperoxides, etc., such as di-t-butyl peroxide, benzoyl peroxide, cumene hydroperoxide, t-butyl hydroperoxide, ethyl peroxy carbonate, and the like, and compounds such as $\alpha,\alpha'$-azodiisobutyronitrile, dimethyl and diethyl $\alpha,\alpha'$-azodiisobutyrate, etc. Such initiators can be used in a concentration of about 0.1% to 1.0% by weight. In addition, polymerization may also be initiated by the use of ultraviolet light as well as by the use of heat alone.

In general, the range of polymerization reaction temperatures employed in producing the copolymers of the present invention varies between about 50° C. and 170° C. and is preferably within the range from about 100° C. to about 150° C. It will be understood that the polymerization temperature selected will usually be varied according to the nature and amount of the particular monomers and catalysts, if any, used, the desired polymerization pressure and the molecular weight of the products which are desired. Likewise the time for polymerization will be dependent on similar factors and can range over a period of from about one hour to about 60 hours, as will be apparent to one skilled in the art. When the preferred operating temperature of about 100 to 150° C. is employed, I have found that suitable copolymers can generally be produced within a period of about 8 to 40 hours, which is accordingly the preferred range of polymerization times.

The copolymerizations of the present invention can be effected at atmospheric or higher pressures. When a volatile comonomer is used, the process can be carried out under the autogenous pressure of the reaction mixture at the temperature employed. In most cases the preferred comonomers (for example, styrene, acrylates and methacrylates, and vinyl esters and others) are sufficiently nonvolatile at the preferred polymerization temperature of 100 to 150° C., that the use of pressures in excess of atmospheric will not be necessary, although they can be used if desired.

For use as lubricant additives the copolymers of the invention should have molecular weights within the range from about 10,000 to about 125,000 and preferably within the range from about 20,000 to about 70,000. Such copolymers can be used in lubricating oils in concentrations of about 0.01% to about 10% by weight and preferably within the range from about 0.5% to about 5%.

EXAMPLE 1

A mixture of 30 ml. styrene, 65 ml. diisooctyl fumarate, 5 ml. benzalmethylimine and 0.2 ml. t-butyl hydroperoxide was heated at 118° C. for 40 hours. The resulting light red highly viscous copolymer did not have the sharp and penetrating odor of the benzalmethylimine. The copolymer was soluble in solvent extracted mineral oil and contained 0.34% nitrogen. Copolymer yield was 87 grams.

EXAMPLE 2

A mixture of 45 ml. lauryl methacrylate, 5 ml. benzalmethylimine, and 0.1 gram benzoyl peroxide was heated at 125° C. for 24 hours. An orange red copolymer containing 0.194% nitrogen and completely soluble in solvent extracted mineral was formed. The copolymer yield was 38.6 grams and had no benzalmethylimine odor.

EXAMPLE 3

A mixture of 10 ml. N-vinyl pyrrolidone, 35 ml. diisooctyl fumarate, 5 ml. benzalmethylimine and 0.1 ml. t-butyl hydroperoxide was heated at 125° C. for 40 hours. Forty-three point four (43.4) grams of red copolymer containing 2.67% nitrogen and soluble in solvent extracted mineral oil was formed from the monomer mixture.

EXAMPLE 4

A mixture of 11.1 grams (0.1 mole) of N-vinyl pyrrolidone, 23 ml. (0.2 mole) styrene, 36.2 ml. (0.1 mole) diisooctyl fumarate, 4.76 grams (0.1 mole) benzalmethylimine and 0.2 ml. cumene hydroperoxide was heated at 150° C. for 24 hours. A light yellow copolymer containing 2.69% nitrogen was formed from the mixture. Yield was 68.5 grams; the product was soluble in solvent extracted mineral oil.

EXAMPLE 5

A mixture of 23.1 ml. (0.2 mole) styrene, 45.2 grams (0.1 mole) dilauryl fumarate, 4.75 (0.05 mole) benzalmethylimine, and 0.1 ml. t-butyl hydroperoxide was heated at 120° C. for 16 hours and at 140° C. for 4 hours. An orange copolymer soluble in solvent extracted mineral oil and containing 0.361% nitrogen was formed from the mixture. Yield of copolymer was 67.6 grams.

EXAMPLE 6

For comparison, and not according to the present invention, a mixture of 23.1 ml. (0.2 mole) styrene, 45.2 grams (0.1 mole) dilauryl fumarate, and 0.1 ml. t-butyl hydroperoxide was heated for 16 hours at 120° C. and for 4 hours at 140° C. Sixty-five (65) grams of a clear colorless copolymer soluble in solvent extracted mineral oil was formed.

EXAMPLE 7

Again for comparison with the benzalmethylimine copolymers, the procedure of Example 1 was used to form a copolymer of benzalethylimine with styrene and diisooctyl fumarate.

EXAMPLE 8

For comparison with the benzalmethylimine copolymers, a copolymer of benzalisopropylimine with styrene and diisooctyl fumarate was prepared by the procedure set out in Example 1.

EXAMPLE 9

Further for comparison with the benzalmethylimine copolymers, a copolymer of benzal t-butyl imine with styrene and diisooctyl fumarate was also prepared by the procedure of Example 1.

The polymeric products of Examples 1–6 were tested for their effectiveness as viscosity index improvers at a concentration of 2% by weight in a solvent extracted SAE 5 mineral oil base. The results are given in the following table.

*Table I*

| Additive: | Viscosity Index |
|---|---|
| None | 90.6 |
| Product of Example 1 | 142 |
| Product of Example 2 | 150 |
| Product of Example 3 | 134 |
| Product of Example 4 | 149 |
| Product of Example 5 | 149 |
| Product of Example 6 | 146 |

The effectiveness of the copolymers of this present invention in improving the detergency characteristics of lubricating oils is demonstrated by the data in Table II. These data were obtained by subjecting a lubricant composition with and without the products of Examples 1–6 to the detergency and oxidation test known as the Indiana Stirring Test (I.S.C.T.). In this test 250 cc. of the oil to be tested is heated at 330–332° F. in a 500 cc. glass beaker in the presence of 5 sq. mm. of copper and 10 sq. mm. of iron. Four glass rods of 6 mm. diameter are suspended in the oil which is stirred at about 1300 r.p.m. by means of a glass stirrer. At intervals of 24, 48, and 72 hours oil samples are withdrawn and sludge, acidity, and varnish values are determined. Varnish values or ratings are based upon visual inspection of the glass rods, in which a rod free of any varnish deposit is given a rating of 10 while a badly coated rod is given a rating of 1. Rods having appearances between these extremes are given intermediate values. The copolymers of this invention were tested at 2% by weight concentration in a solvent extracted SAE 30 mineral oil base containing 0.75% of sulfurized dipentene, with the results shown in Table II.

*Table II*

| Additive | Varnish Rating | | | Naphtha Insoluble (Sludge)[1] | | | Acidity (mg. KOH per g. oil) | | |
|---|---|---|---|---|---|---|---|---|---|
| | 24 Hrs. | 48 Hrs. | 72 Hrs. | 24 Hrs. | 48 Hrs. | 72 Hrs. | 24 Hrs. | 48 Hrs. | 72 Hrs. |
| None | 10 | 8 | 5 | 0.071 | 2.1 | 5.7 | 3.92 | 7.0 | 10.08 |
| Product of Example 1 | 10 | 10 | 10 | trace | trace | 2.7 | 2.8 | 3.3 | 4.4 |
| Product of Example 2 | 10 | 10 | 10 | trace | 0.4 | 4.2 | 3.3 | 3.6 | 5.6 |
| Product of Example 3 | 10 | 10 | 9 | trace | 0.8 | 2.4 | 2.8 | 3.3 | 3.3 |
| Product of Example 4 | 10 | 10 | 9 | trace | 1.2 | 4.1 | 2.8 | 3.3 | 4.4 |
| Product of Example 5 | 10 | 10 | 10 | trace | 0.8 | 3.1 | 4.2 | 4.2 | 5.6 |
| Product of Example 6 | 10 | 9 | 7 | trace | 3.0 | 5.7 | 3.4 | 4.2 | 7.7 |

[1] Milligrams per 10 grams oil.

With reference to the above data of Table II it is seen that the polymers of my present invention in comparison with the mineral oil alone and the polymer of Example 6, having no benzalmethylimine content, gave superior results when tested for acidity, varnish deposits, and naphtha insoluble sludge formation in the detergency and oxidation test.

The detergent properties of the copolymers of my invention are further demonstrated by the comparative data in Table III, which are the results of the carbon suspension test (C. B. Biswell et al., Ind. Eng. Chem. 47, 1958, 1601 (1955). The products were tested at 0.5% concentration in 70 cc. kerosene with three grams of a paste containing 20% carbon black in a heavy white oil base, stirring the mixture five minutes in a 100 cc. graduate in a Herschel demulsibility tester at room temperature (25° C.). After 5 days (120 hours) the percentage of carbon black which had settled out was recorded.

*Table III*

| Product: | Percent settled in 120 hours |
|---|---|
| None | [1]90 |
| Example 1 | 0 |
| Example 2 | 0 |
| Example 3 | 0 |
| Example 4 | 0 |
| Example 5 | 0 |
| Example 6 | [2]100 |
| Example 7 | 20 |
| Example 8 | 30 |
| Example 9 | 45 |

[1] In 4 hours.
[2] In 2 hours.

It can be seen from the above data that the novel copolymers of my invention are effective both as viscosity index improvers and detergents in oils. By contrast, a comparison in Table III of the product of Example 6 with that of Example 5 demonstrates that polymers similar to those of the invention except containing no benzal imine possess no detergent properties whatsoever. Comparison of the percents of carbon settled in the presence of the copolymers of benzalethylimine, of benzalisopropylimine and of benzal t-butylimine of Examples 7 and 8 and 9 with percentage of carbon settled in the presence of the benzal methylimine copolymer of Example 1, having the same copolymerized materials, demonstrates the detergency properties of all of the benzalalkylimine copolymers prepared as well as the remarkably complete detergency of the preferred benzalmethylimine copolymers.

The products of this invention can be used in lubricating oils in concentrations of from about 0.01% to about 10% and preferably from about 0.5% to about 5% by weight. Although the present invention has been illustrated by the use of these products in mineral lubricating oils it is not restricted thereto. Other lubricating oil bases can be used, such as hydrocarbon oils, both natural and synthetic, for example, those obtained by the polymerization of olefins, as well as synthetic lubricating oils of the alkylene oxide type and the polycarboxylic acid ester type, such as the oil soluble esters of adipic acid, sebacic acid, azelaic acid, etc. It is also contemplated that various other well known additives, such as antioxidants, anti-foaming agents, pour point depressors, extreme pressure agents, antiwear agents, etc., may be incorporated in lubricating oils containing the additives of my invention.

Addition agent concentrates of a suitable oil base containing more than 10%, for example up to 50% or more, of the copolymers of this invention alone or in combination with other additives can be used for blending with hydrocarbon oils or other oils, in the proportions desired for the particular conditions of use to give a finished product containing from about 0.01% to about 10% of the copolymers of this invention.

Unless otherwise stated, the percentages given herein and in the claims are percentages by weight.

While I have described my invention by references to specific embodiments thereof, the same are given by way of illustration only. Modifications and variations will be apparent from my description to those skilled in the art.

I claim:
1. A lubricant composition comprising a major amount of a lubricating oil and a viscosity index improving amount of an oil-soluble copolymer having a molecular weight in the range of from about 10,000 to about 125,000 the molecular units of which copolymer consist essentially of benzalmethylimine and a substituted-hydrocarbon monomer having terminal ethylenic unsaturation and having as the substitutent a negative group selected from the class consisting of aryl, acyloxy, alkoxy, aroyloxy, carbalkoxy, halogen, cyano and lactam, said substituents being bonded to the unsaturated carbon of said terminal ethylenic unsaturation and said substituted hydrocarbon monomer having from about 6 to about 30 carbon atoms, the mole ratio of benzalmethylimine to said substituted-hydrocarbon monomer being in the range of from about 1:200 to about 1:1, said copolymer having been obtained by copolymerizing benzalmethylimine with said substituted-hydrocarbon monomer having terminal ethylenic unsaturation at a temperature in the range of about 50 to about 170° C.

2. The composition of claim 1 wherein the substituted-hydrocarbon monomer having terminal ethylenic unsaturation is N-vinyl pyrrolidone.

3. The lubricant composition of claim 1 wherein said copolymer is present in a range of from about .1% to about 10% by weight.

4. An addition agent concentrate for lubricating oils comprising a lubricating oil containing the oil soluble copolymer of claim 1 in an amount greater than 10% by weight and being capable of dilution with a lubricating oil to form a homogeneous mixture of said copolymer in an amount of from about 0.1% to about 10% by weight.

5. The composition of claim 1 wherein the substituted-hydrocarbon monomer having terminal ethylenic unsaturation is lauryl methacrylate.

6. The composition of claim 1 wherein the substituted-hydrocarbon monomer having terminal ethylenic unsaturation is styrene.

7. A lubricant composition comprising a major amount of a lubricating oil and a viscosity index improving amount of an oil-soluble copolymer having a molecular weight in the range of from about 10,000 to about 125,000, the monomeric units of which copolymer consist essentially of a benzalalkylimine whose alkyl group has from 1 to 5 carbon atoms, a substituted-hydrocarbon monomer having terminal ethylenic unsaturation and having as the substituent a negative group selected from the class consisting of aryl, acyloxy, alkoxy, aroyloxy, carbalkoxy, halogen, cyano and lactam, said substituents being bonded to the unsaturated carbon of said terminal ethylenic unsaturation and said substituted hydrocarbon monomer having from about 6 to about 30 carbon atoms and a diester of a butenedioic acid, which diester has the formula

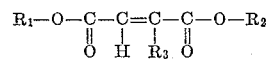

wherein $R_1$ and $R_2$ are alkyl having from about 4 to about 22 carbon atoms and $R_3$ is selected from the class consisting of hydrogen and methyl, the mole ratio of benzalalkylimine to said substituted-hydrocarbon monomer having terminal ethylenic unsaturation and said diester of a butenedioic acid is in the range of from about 1:200 to 1:1, said copolymer having been obtained by copolymerizing said benzalalkylimine, said substituted-hydrocarbon monomer having terminal ethylenic unsaturation and said diester of a butenedioic acid at a temperature in the range of about 50 to about 170° C.

References Cited by the Examiner
UNITED STATES PATENTS

| | | | |
|---|---|---|---|
| 2,948,654 | 5/61 | Agius et al. | 252—51.5 X |
| 3,048,544 | 8/62 | Stewart et al. | 252—51.5 X |
| 3,048,615 | 8/62 | Fields | 252—51.5 X |
| 3,048,616 | 8/62 | Fields | 252—51.5 X |
| 3,048,617 | 8/62 | Fields | 252—51.5 X |
| 3,110,672 | 11/63 | Fields | 252—51.5 |

OTHER REFERENCES

Biswell et al.: "A New Class of Polymeric Dispersants for Hydrocarbon Systems." Paper presented at 125th National Meeting, ACS, Kansas City, Mo. Pub. by Du Pont; p. 3 pertinent (7 pages).

DANIEL E. WYMAN, *Primary Examiner.*

JOSEPH R. LIBERMAN, *Examiner.*